(12) United States Patent
Chen et al.

(10) Patent No.: US 9,350,243 B2
(45) Date of Patent: May 24, 2016

(54) POWER CONVERTER WITH SEPARATE BUCK AND BOOST CONVERSION CIRCUITS

(71) Applicant: KONINKLIJKE PHILIPS N.V., Eindhoven (NL)

(72) Inventors: Zhi Quan Chen, Shanghai (CN); Jian Lin Xu, Shanghai (CN); Hong Bo Wang, Shanghai (CN); Zhen Hua Zhou, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/370,591

(22) PCT Filed: Jan. 4, 2013

(86) PCT No.: PCT/IB2013/050087
§ 371 (c)(1),
(2) Date: Jul. 3, 2014

(87) PCT Pub. No.: WO2013/102879
PCT Pub. Date: Jul. 11, 2013

(65) Prior Publication Data
US 2015/0303803 A1  Oct. 22, 2015

Related U.S. Application Data

(60) Provisional application No. 61/583,645, filed on Jan. 6, 2012.

(51) Int. Cl.
G05F 1/24 (2006.01)
H02M 3/158 (2006.01)

(52) U.S. Cl.
CPC .................................. *H02M 3/158* (2013.01)

(58) Field of Classification Search
CPC . H02M 3/156; H02M 3/1588; H02M 3/3582; H02M 3/157
USPC .................. 323/222, 224, 256, 271, 282–285
See application file for complete search history.

(56) References Cited

U.S. PATENT DOCUMENTS 6,037,755 A   3/2000 Mao et al.
6,348,781 B1  2/2002 Midya et al.
(Continued)

FOREIGN PATENT DOCUMENTS

EP    1548921 A1   6/2005

OTHER PUBLICATIONS

S. Deuty; "Optimizing Transistor Performance in Shynchronous Rectifier Buck Converters", Applied Power Electronics Conf and Exposition, Vol. 2, Feb. 6, 2000, pp. 675-678, XP010371606.
(Continued)

*Primary Examiner* — Nguyen Tran

(57) ABSTRACT

An apparatus (100) includes a buck and boost conversion circuit (110), and a control unit (120, 200) for controlling operations of the buck and boost converter. The buck and boost converter includes a buck conversion circuit having a first set of switches (SW3, SW4), and a boost conversion circuit having a second set of switches (SW5, SW6). The buck conversion circuit and the boost conversion circuit may be controlled independently from each other. The control unit is configured to control delivery of power from the power converter to a load (20) via the buck conversion circuit in a buck conversion mode by controlling switching operations of the first set of switches, and to control the delivery of the power from the power converter to the load via the boost conversion circuit in a boost conversion mode by controlling switching operations of the second set of switches.

15 Claims, 4 Drawing Sheets

(56) References Cited

U.S. PATENT DOCUMENTS

| | | | |
|---|---|---|---|
| 7,443,147 B2 * | 10/2008 | Kasai | H02M 3/1582 |
| | | | 323/259 |
| 7,495,419 B1 | 2/2009 | Ju | |
| 2010/0231189 A1 | 9/2010 | Chen et al. | |
| 2011/0089915 A1 | 4/2011 | Qiu et al. | |
| 2011/0140536 A1 * | 6/2011 | Adest | H02J 1/12 |
| | | | 307/82 |

OTHER PUBLICATIONS

Pallab Midya et al; "Buck or Boost Tracking Power Converter", IEEE Power Electronics Letters, vol. 2, No. 4, Dec. 2004, pp. 131-134.

* cited by examiner

POWER CONVERTER WITH SEPARATE BUCK AND BOOST CONVERSION CIRCUITS

CROSS-REFERENCE TO PRIOR APPLICATIONS

This application is the U.S. National Phase application under 35 U.S.C. §371 of International Application No. PCT/IB13/050087, filed on Jan. 4, 2013, which claims the benefit of U.S. Provisional Patent Application No. 61/583,645, filed on Jan. 6, 2012. These applications are hereby incorporated by reference herein.

TECHNICAL FIELD

The present invention is directed generally to a power converter. More particularly, various inventive methods and apparatus disclosed herein relate to a buck and boost converter with separate buck and boost conversion circuits.

BACKGROUND

In general, power converters typically fall into one of three categories buck converters; boost converters, and buck-boost converters.

A buck converter is a step-down DC to DC converter, i.e., it converts a higher DC input voltage to a lower DC output voltage, and in general it is a switching mode power supply. In general a buck converter may be highly efficient, but it operates over a narrow range of input voltage, when the input voltage received from a voltage source is greater than the output voltage to be supplied to a load.

A boost converter is a set-up DC to DC converter, i.e., it converts a lower DC input voltage to a higher DC output voltage, and in general it is also a switching mode power supply. In general a boost converter may have a simple circuit structure and may provide a small ripple current at its input. However, like the buck converter it operates over a narrow range of input voltage, when the input voltage received from a voltage source is greater than the output voltage to be supplied to a load.

A buck-boost converter is a type of DC to DC converter that has an output voltage magnitude that can be either greater than, or lees than, the input voltage magnitude. In other words, a buck-boost converter includes both buck converter functionality and boost converter functionality.

In a conventional buck-boost converter, the buck functionality and boost functionality are not separate or independent from each other, but they share some important components such as the switching devices (e.g., MOSFETs, diodes, etc.), and therefore cannot be separately controlled or optimized. The conventional buck-boost converter exhibits some limitations in terms of its efficiency, a limited range of input and output voltages, and the number of applications to which it can be applied.

Thus, it would be desirable to provide a power converter which is capable in operating in a buck conversion mode and a boost conversion mode. It would also be desirable to provide such a power converter which is capable of operating with greater efficiency over a wide range of input and output voltages in many different applications.

SUMMARY

The present disclosure is directed to inventive methods and apparatus for a power converter. For example, in some embodiments a power converter is provided with a buck converter circuit and boost converter circuit which can be separately and independently controlled.

Generally, in one aspect, the invention relates to an apparatus including: a power converter configured to convert an input voltage to an output voltage and to supply the output voltage to a load, and a control unit configured to control an operation of the power converter. The power converter includes: a buck converters circuit including a first set of switches, and a boost conversion circuit including a second set of switches, wherein the second set of switches are separate from and capable of being controlled independently from the first set of switches. The control unit is configured to control delivery of power from the power converter to the load via the buck conversion circuit in a buck conversion mode by controlling switching operations of the first set of switches, and to control the delivery of the power from the power converter to the load via the boost conversion circuit in a boost conversion mode by controlling switching operations of the second set of switches.

In one or more embodiments, the control unit is configured to receive a sample of the input voltage, a sample of the output voltage, a sample of an input current supplied to the power converter, and a sample of an output current supplied by the power converter, and is configured to control the delivery of the power to the load based on the sample of the input voltage, the sample of the output voltage, the sample of the input current and the sample of the output current.

According to one optional feature of these embodiments, the control unit includes a plurality of analog-to-digital converter (ADCs) configured to convert the sample of the input voltage, the sample of the output voltage, the sample of the input current and the sample of the output current to digital values. According to another optional feature of these embodiments, the control unit includes circuitry configured to compare the input voltage and the output voltage to each other, wherein the control unit selects the power converter operating mode based on a result of the comparison. According to yet another optional feature of these embodiments, the control unit is configured to control the delivery of power from the power converter to the load via the buck conversion circuit by switching at least one of the switches of the first set of switches at a switching frequency and a duty cycle, and by adjusting at least one of the switching frequency and the duty cycle in response to a difference between the sample of the input voltage and the sample of the output voltage. According to a further optional feature of these embodiments, the control unit is configured to control the delivery of power from the power converter to the load via the boost conversion circuit by switching at least one of the switches of the second set of switches at a switching frequency and a duty cycle, and by adjusting at least one of the switching frequency and the duty cycle in response to a difference between the sample of the input voltage and the sample of the output voltage.

In one or more embodiments, the control unit is configured: to control delivery of power from the power converter to the load when the input voltage is greater than a sum of the output voltage and a first fixed voltage, wherein the first fixed voltage is greater than or equal to zero volts, by controlling the switching operations of the first set of switches; and to control the delivery of the power from the power converter to the load when the input voltage is less than the output voltage by controlling the switching operations of the second set of switches.

According to one optional feature of these embodiments, the first fixed voltage is less than 1 volt. According to another optional feature of these embodiments, the control unit is further configured to control the power converter to operate in a direct conversion mode when the output voltage is greater than a difference between the input voltage and the first fixed voltage, and less than a sum of the input voltage and the second fixed voltage.

Generally, in another aspect, the invention relates to a method including: sampling an input voltage, an output voltage, an input current and an output current of a power converter that includes a buck conversion circuit including a first set of switches and a boost conversion circuit including a second set of switches, wherein the second set of switches are separate from and capable of being controlled independently from the first set of switches; when the input voltage is greater than a sum of the output voltage and a first fixed voltage that is greater than or equal to zero volts, controlling delivery of power from the power converter to a load by controlling switching operations of the first set of switches; and when the input voltage is less than the output voltage, controlling the delivery of the power from the power converter to the load by controlling switching operations of the second set of switches.

In one or more embodiments, controlling delivery of power from the power converter to a load by controlling the switching operations of the first set of switches of the buck conversion circuit comprises supplying one or more control signals to one or more switches of the first set of etches and pulse width modulating the one or more control signals.

According to one optional feature of this embodiment, pulse width modulating the one or more control signals comprises adjusting one of a frequency and a duty cycle of each pulse width modulated control signal in response to a difference between the input voltage and the output voltage.

In one or more other embodiments, controlling delivery of power from the power converter to a load by controlling the switching operations of the second set of switches of the boost conversion circuit comprises supplying one or more control signals to one or more switches of the second set of switches and pulse width modulating the one or more control signals According to one optional feature of this embodiment, pulse width modulating the one or more control signals comprises adjusting one of a frequency and a duty cycle of each pulse width modulated control signal in response to a difference between the input voltage and the output voltage.

In one or more embodiments, the first fixed voltage is less than 1 volt.

Generally, in yet another aspect, the invention relates to an apparatus including a buck and boost power converter capable or operating in a buck conversion mode and in a boost conversion mode, and a control unit. The buck and boost power converter comprises: an input node; an output node; a first switch having a first terminal, a second terminal, and a control terminal for selectively opening and closing the first switch to control a current path between the first terminal and the second terminal, wherein the first terminal is connected to the input node; a first capacitor connected between the second terminal of the first switch and ground; a second switch having a first terminal, a second terminal, and a control terminal for selectively opening and closing the second switch to control a current path between the first terminal and the second terminal, wherein the first terminal is connected to the second terminal of the first switch and to the first capacitor; a third switch having a first terminal, a second terminal, and a control terminal for selectively opening and closing the third switch to control a current path between the first terminal and the second terminal, wherein the third switch is connected in parallel with the second switch; a fourth switch having a first terminal, a second terminal, and a control terminal for selectively opening and closing the fourth switch to control a current path between the first terminal and the second terminal, wherein the first terminal is connected to the second terminals of the second and third switches, and the second terminal is connected to ground; an inductor having a first terminal and a second terminal, wherein the first terminal is connected to the second terminals of the second, third and fourth switches; a fifth switch having a first terminal, a second terminal, and a control terminal for selectively opening and closing the fifth switch to control a current path between the first terminal and the second terminal, wherein the first terminal is connected to the second terminal of the inductor, and the second terminal is connected to ground; a sixth switch having a first terminal, a second terminal, and a control terminal for selectively opening and closing the sixth switch to control a current path between the first terminal and the second terminal, wherein the first terminal is connected to the second terminal of the inductor and the first terminal of the fifth switch; a seventh switch having a first terminal, a second terminal, and a control terminal for selectively opening and closing the seventh switch to control a current path between the first terminal and the second terminal, wherein the sixth switch is connected in parallel with the fifth switch; a second; capacitor connected between the second terminals of the sixth and seventh switches and ground; and an eighth switch having a first terminal, a second terminal, and a control terminal for selectively opening and closing the sixth switch to control a current path between the first terminal and the second terminal, wherein the first terminal is connected to the second capacitor and the second terminals of the sixth and seventh switches, and wherein the second terminal is connected to the output node. The control unit is configured to provide first through eighth control signals to corresponding ones of the control terminals of the first through eighth switching devices so as to control switching of the first through eighth switching devices to cause the buck and boost power converter to operate selectively in one of a boost conversion mode and a buck conversion mode.

In one or more embodiments, when the control unit controls the buck and boost power converter to operate in the buck conversion mode, the control unit provides: the first control signal to turn on the first switch; the second control signal to turn off the second switch; the third control signal as a first pulse width modulated signal having a first frequency and a first duty cycle to alternately turn on and turn off the third switch; the fourth control signal as a second pulse width modulated signal having the first frequency and a second duty cycle to alternately turn on and turn off the fourth switch; the fifth control signal to turn off the fifth switch; the sixth control signal to turn off the sixth switch; the seventh control signal to turn on the seventh switch; and the eighth control signal to turn on the eighth switch.

In one or more embodiments, when the control unit controls the buck and boost power converter to operate in the boost conversion mode, the control unit provides: the first control signal to turn on the first switch; the second control signal to turn on the second switch; the third control signal to turn off the third switch; the fourth control signal to turn off the fourth switch; the fifth control signal a first pulse width modulated signal having a first frequency and a first duty cycle to alternately turn on and turn off the fifth switch; the sixth control signal as a second pulse width modulated signal having the first frequency and a second duty cycle to alternately turn on and turn off the sixth switch; the seventh control signal to turn off the seventh switch; and the eighth control signal to turn on the eighth switch.

In one or more embodiments, the control unit includes a plurality of analog-to-digital converter (ADCs) configured to provide digital values representing: an input voltage at the input node, an input current through the input node an output voltage at the output node, an output current through the output node, and the control unit generates the first through eighth control signals to corresponding ones of the control terminals of the first through eighth switching devices so as to control switching of the first through eighth switching devices to cause the buck and boost power converter to operate selectively in one of a boost conversion mode and a buck conversion mode in response to the digital values.

According to one optional feature of this embodiment, the control unit is configured: to cause the buck and boost power converter to operate in the buck conversion mode when the input voltage is greater than a sum of the output voltage and a first fixed voltage, wherein the first fixed voltage is greater than or equal to zero volts; to cause the buck and boost power converter to operate in the boost conversion mode when the input voltage is less than the output voltage; and to cause the buck and boost power converter to operate in a direct conversion mode when the output voltage is greater than a difference between the input voltage and the first fixed voltage, and less than output voltage.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the viable spectrum (generally including radiation wavelengths from approximately 380 nanometers to approximately 780 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, radioluminescent sources, and luminescent polymers.

A "lighting driver" is used herein to refer to an apparatus that supplies electrical power to one or more light sources in a formal to cause the light sources to emit light. In particular, a lighting driver may receive electrical power in a first format (e.g., AC Mains power; a fixed DC voltage; etc.) and supplies power in a second format that is tailored to the requirements of the light source(s) (e.g. LED light source(s)) that it drives.

The terms "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry; a lighting driver) relating to the operation of the light source(s). An "LED-based lighting unit" refers to a lighting unit that includes one or more LED-based light sources as discussed above, alone or in combination with other non LED-based light sources.

The term "controller" is used herein generally to describe various apparatus relating to the operation of a power converter. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It should be appreciated that all combinations of the foregoing concepts and additional concepts discussed in greater detail below (provided such-concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As discussed above, conventional buck-boost power converters exhibit some limitations in terms of efficiency, a limited range of input and output voltages, and the number of applications to which they can be applied. Therefore, Applicant herein has recognized and appreciated that it would be beneficial to provide a buck and boost converter which is capable in operating in a buck conversion mode and a boost conversion mode with greater efficiency over a wide range of input and output voltages in many different applications.

In view of the foregoing, various embodiments and implementations of the present invention are directed to a buck and boost converter wherein one or more switches employed for a buck conversion operation are separate from and may be independently controlled with respect to one or more switches employed for a boost conversion operation.

Figure 1:
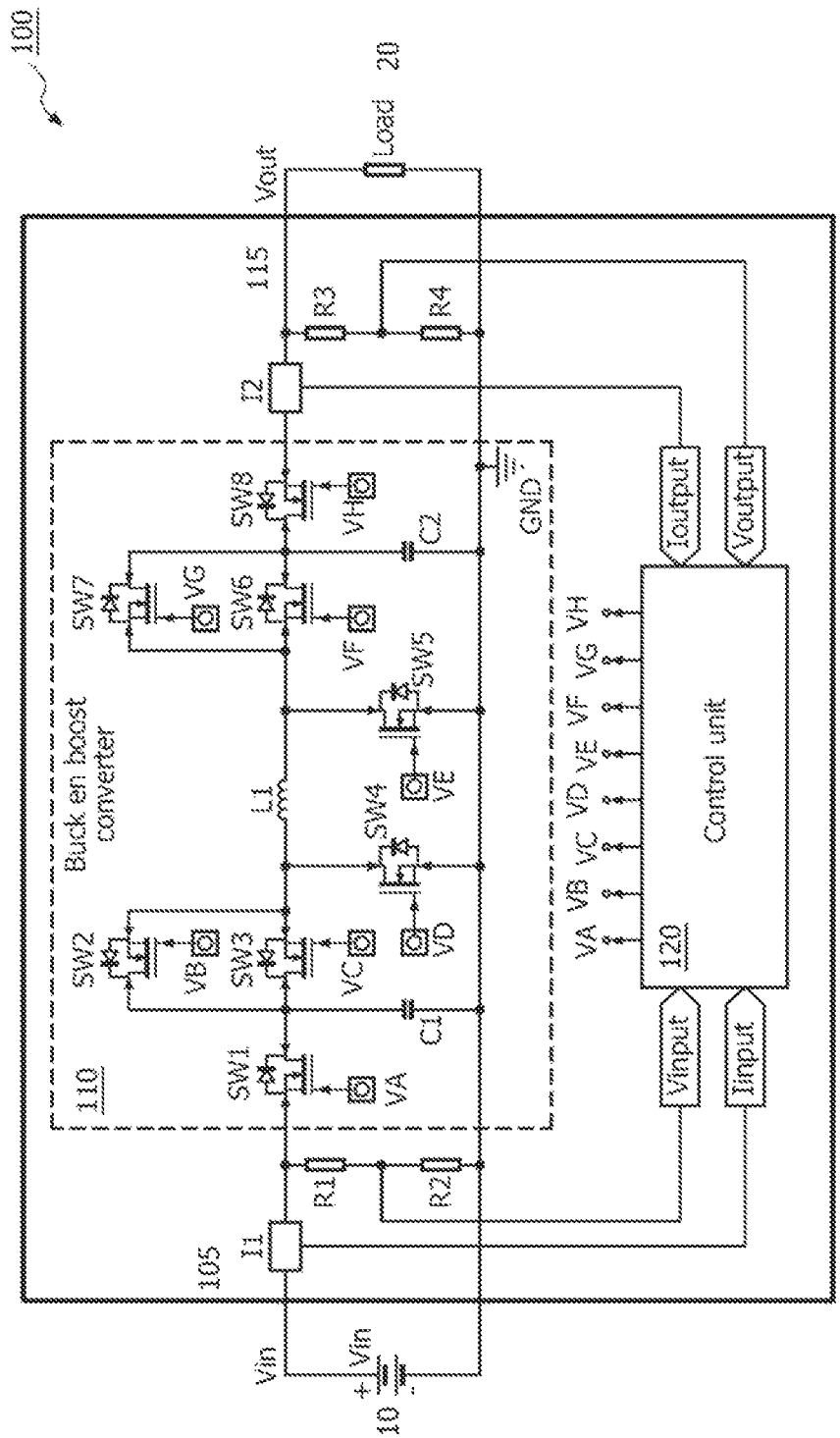
FIG. 1 illustrates an example embodiment of an apparatus including a buck and boost converter.

FIG. 1 illustrates an example embodiment of an apparatus 100 including a buck and boost converter. Apparatus 100 includes a power converter 110 and a control unit 120.

Power converter 110 includes an input node 105 and an output node 115. Input node 105 is connected to, and receives an input voltage VIN from, a voltage supply 10. Output node 115 is connected to, and supplies an output voltage VOUT to, a load 20. Power converter 110 also includes a first switch SW1, second switch SW2, third switch SW3, fourth switch SW4, fifth switch SW5, sixth switch SW6, seventh switch SW7, eighth switch SW8, first capacitor C1, second capacitor C2, and an inductor L1. Power converter 110 also includes first and second current sensing units I1 and I2, and voltage sampling resistors R1, R2, R3 and R4. In some embodiments, first through eighth switches SW1~SW8 are transistors, and in a particular embodiment are metal oxide semiconductor field effect transistors (MOSFETs). In some embodiments, one or more of the elements such as first capacitor C1, second capacitor C2, inductor L1, and voltage sampling resistors R1, R2, R3 and R4 may be realized with a combination of a plurality of series and or parallel arrangements of similar elements (e.g., C1 could be realized by 2, 3 or 4 capacitors in parallel; L1 could be two inductors in series; etc.).

Control unit 120 receives samples of: the input voltage VIN sampled by the voltage sampling resistors R1 and R2; the input current provided to input node 105 by voltage supply 10 and sampled by first current sensing unit I1; the output voltage VOUT sampled by the voltage sampling resistors R3 and R4; and the output current supplied to load 20 by power converter 110 and sampled by second current sensing unit I2. In response to these samples, control unit 120 generates eight switch control signals VA, VB, VC, VD, VE, VF, VG and VH for controlling the switched states of the eight switches SW1~SW8 to cause power converter 110 to convert the input voltage VIN at input node 105 to an output voltage VOUT at output node 115. In particular, control unit 120 supplies: VA to first switch SW1; VB to second switch SW2; VC to third switch SW3; VD to fourth switch SW4; VE to fifth switch SW5; VF to sixth switch SW6; VG to seventh switch SW7; VH to eighth switch SW8. Further details of a particular embodiment of control unit 120 will be provided with respect to FIG. 2 below.

Power converter 110 is a buck-boost converter, and which may also be referred to as a buck and boost converter, and is capable of operating in a buck conversion mode and a boost conversion mode as explained in greater detail below. Power converter 110 includes a buck conversion circuit and a boost conversion circuit which are capable or being controlled independently of each other. Power converter 110 also includes a direct conversion mode which transfers the input voltage VIN at input node 105 to output node 115 as the output voltage VOUT.

The buck conversion circuit includes a first set of switches including third and fourth switches SW3 and SW4 which are switched in response to pulse width modulation (PWM) signals for power converter 110 to operate in a buck conversion mode. The third and fourth switches SW3 and SW4 operate together with C1, C2, L1 and SW7 to realize a buck conversion mode. In the book conversion mode, first, seventh and eighth switches SW1, SW7 and SW8 remain turned ON while the second, fifth and sixth switches SW2, SW5 and SW6 remain turned OFF. In some embodiments, in the buck conversion mode the switches are controlled according to the following sequence: (1) turn ON first switch SW1; (2) turn OFF fifth and sixth switches SW5 and SW6; (3) turn OFF second switch SW2; (4) turn ON seventh switch SW7; (5) turn ON eighth switch SW8; and (6) drive third and fourth switches SW3 and SW4 with a PWM signal whose duty cycle and/or frequency can be adjusted or varied to convert the input voltage VIN to the output voltage VOUT. Thus while it seen that all eight of the switches SW1~SW8 must have proper settings for implementing the buck conversion mode, it is the particular switching operations of third and fourth switches SW3 and SW4 in response to PWM control signals from control unit 120 that realize the voltage buck effect to convert the input voltage VIN to the output voltage VOUT.

The boost conversion circuit induces a second set of switches including fifth and sixth switches SW5 and SW6. The fifth and sixth switches SW5 and SW6 operate together with C1, C2, L1 and SW2 to realize a boost conversion mode. In the boost conversion mode, first and eighth switches SW1 and SW8 remain turned ON while the third and fourth switches SW3 and SW4 remain turned OFF in some embodiments, in the buck conversion mode the switches are controlled according to the following sequence: (1) turn ON first switch SW1; (2) turn OFF third and fourth switches SW3 and SW4; (3) turn off seventh switch SW7; (4) turn ON second switch SW2; (5) turn ON eighth switch SW8; and (6) drive fifth and sixth switches SW5 and SW6 with a PWM signal whose duty cycle and/or frequency can be adjusted or varied to convert the input voltage VIN to the output voltage VOUT. Thus while it seen that all eight of the switches SW1~SW8 must have proper settings for implementing the boost conversion mode, it is the particular switching operations of fifth and sixth switches SW5 and SW6 in response to PWM control signals from control unit 120 that realizes the voltage boost effect to convert the input voltage VIN to the output voltage VOUT.

The direct conversion circuit includes a third set of switches including second and seventh SW2 and SW7, which are turned ON for power converter 110 to operate in a direct conversion mode. The second and seventh switches SW2 and SW7 operate together with C1, C2, and L1 to realize the direct conversion mode. In the direct conversion mode, first, second, seventh and eighth switches SW1, SW2, SW7 and SW8 remain turned ON while third, fourth, fifth and sixth switches SW3, SW4, SW5 and SW6 remain turned OFF.

First switch SW1 provides input reverse protection for power converter 110, and eighth switch SW8 provides output reverse protection for power converter 110, and may also be used to switch power converter 110 ON or OFF under various conditions In operation, the output voltage VOUT of power converter 110 can be less than, equal to, or greater than the input voltage VIN. For example, input voltage VIN may be provided from a voltage supply 10 (e.g., a solar panel) whose voltage may not be constant, but instead which may vary significantly depending on environmental conditions and output voltage VOUT may be determined by the nature of load 20, for example load 20 may comprise a battery having a substantially fixed voltage, in that case, control 120 needs to control power converter 110 to operate in different modes depending on whether the input voltage VIN is greater than, equal to, or less than the output voltage VOUT.

Theoretically, control unit 120 should control the first through eighth switches SW1~SW8 to cause apparatus 100: to operate in the boost conversion mode when the input voltage VIN at input node 105 is less than the output voltage VOUT at output node 115; to operate in the direct conversion mode when the input voltage VIN is equal to the output voltage VOUT; and to operate in the buck conversion mode when the input voltage VIN is greater than the output voltage VOUT.

However, due to small voltage drops across the switches in power converter 110, and perhaps a desire to provide hysteresis, in practice control unit 120 causes apparatus 100 to operate in the direct conversion mode over a small range of input voltages VIN about the output voltage VOUT.

Accordingly, in practice control unit 120 controls power converter 110 to operate: in a buck conversion mode when the input voltage VIN is greater than a buck threshold voltage; in a boost conversion mode when the input voltage VIN is less than a boost threshold voltage; and in a direct conversion mode when the input voltage VIN is between the boost threshold voltage and the buck threshold voltage. In some embodiments, the buck threshold voltage is equal to the sum of the output voltage VOUT and a first fixed voltage. In general, the first fixed voltage is relatively small, for example less than 1 volt, and in particular 0.5 volts. In some embodiments, the first threshold voltage may be zero. The boost threshold voltage is equal to the difference between the output voltage VOUT and a second fixed voltage. In some embodiments, the second fixed voltage may be zero, if which case the boost threshold voltage equals the output voltage VOUT.

Figure 2:
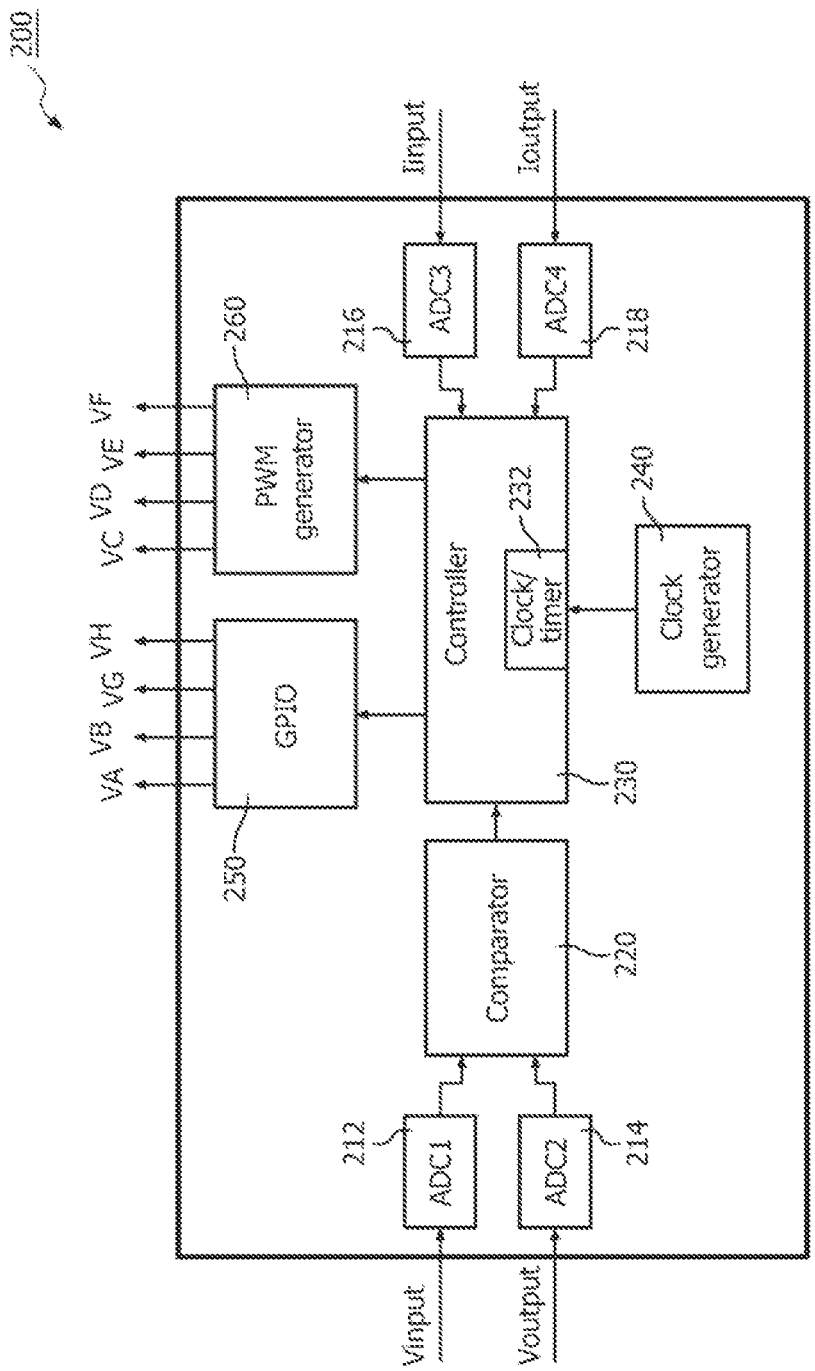
FIG. 2 illustrates one example embodiment of a control unit for a buck and boost converter.

FIG. 2 illustrates one example embodiment of a control unit 200 for a buck and boost converter. Control unit 200 may be one embodiment of control unit 120 of FIG. 1. Control unit 200 includes: a plurality of analog-to-digital converters (ADCs) 212, 214, 216 and 218; a comparator 220; a controller 230; a clock generator 240; a general purpose input/output (GPIO) interface 250; and a pulse width modulation (PWM) generator 260.

Controller 230, which may comprise a processor such as a general purpose processor, an application specific integrated circuit (ASIC), etc., includes a clock/timer circuit 232. In an embodiment when controller 230 comprises a programmable processor, it may further comprise a memory device including code or instructions for causing the processor to execute an algorithm for controlling operations of a power converter, such as power converter 110, as described in greater detail below.

GPIO interface 250 outputs first, second, seventh and eighth control signals VA, VB, VG and VH. PWM generator 260 outputs third, fourth, fifth and sixth control signals VC, VD, VE and VF, which are PWM signals with a variable duty cycle and/or frequency for implementing a buck conversion mode or a boost conversion mode and as will be explained in greater detail below. PWM generator 260 may include several PWM circuits which may operate independently, for example one PWM circuit each for third, fourth, fifth and sixth PWM control signals VC, VD, VE and VF.

An operation of control unit 200 will now be provided in a specific embodiment where control unit 200 is used as control unit 120 of apparatus 100.

In operation, ADCs 212, 214, 216 and 218 receive samples of: an input voltage (e.g., the input voltage VIN sampled by the voltage sampling resistors R1 and R2 in FIG. 1); an input current (e.g., the input current provided to input node 105 by voltage supply 10 and sampled by first current sensing unit I1 in FIG. 1); an output voltage (e.g., the output voltage VOUT sampled by the voltage sampling resistors R3 and R4 in FIG. 1); and an output current (e.g., the output current supplied to load 20 by power converter 110 and sampled by second current sensing unit I2). In response to the received sample voltages and sample currents, ADCs 212, 214, 216 and 218 produce digital values representing the analog input samples. Comparator 220 compares the digital values representing the sampled input voltage, and the digital values representing the sampled output voltage, and provides a comparison signal to controller 230 that allows controller 230 to determine whether to control power converter 110 to operate in a buck conversion mode, a boost conversion mode, or a direct conversion mode.

As explained above, in response to the comparison of the sampled input voltage and the sampled output voltage, controller 230 determines whether to control power converter 110 to operate in a buck conversion mode, a boost conversion mode, or a direct conversion mode. In particular, when the input voltage VIN is greater than a buck threshold voltage (e.g., the output voltage VOUT plus a small first fixed voltage), then controller 230 determines that power converter 110 should operate in a book conversion mode. When the input voltage VIN is less than a boost threshold voltage (e.g., the output voltage VOUT), then controller 230 determines that power converter 110 should operate in a boost conversion mode. And when the input voltage VIN is between the boost threshold voltage and the buck threshold voltage, controller 230 determines that power converter 110 should operate in a direct conversion mode.

Controller 230 causes GPIO interface 250 to output first, second, seventh and eighth control signals VA, VB, VG and VH, and PWM generator 260 to output third, fourth, fifth and sixth control signals VC, VD, VE and VF, according to the selected operating mode of power converter 100.

As explained above, unit 200 may be one embodiment of control unit 120 of FIG. 2. However, if should be understood that other embodiments of control unit 120 of FIG. 1 are possible. In some embodiments, comparator 220 may be omitted and controller 230 may itself compare the digital values for the sampled input voltage and the sampled output voltage. In other embodiments ADCs 212 and 214 and comparator 220 may be replaced by an analog comparator that compares the sampled input and output voltages, followed by a single ADC which converts the comparison result to a digital value. Other arrangements are possible.

Figure 3:
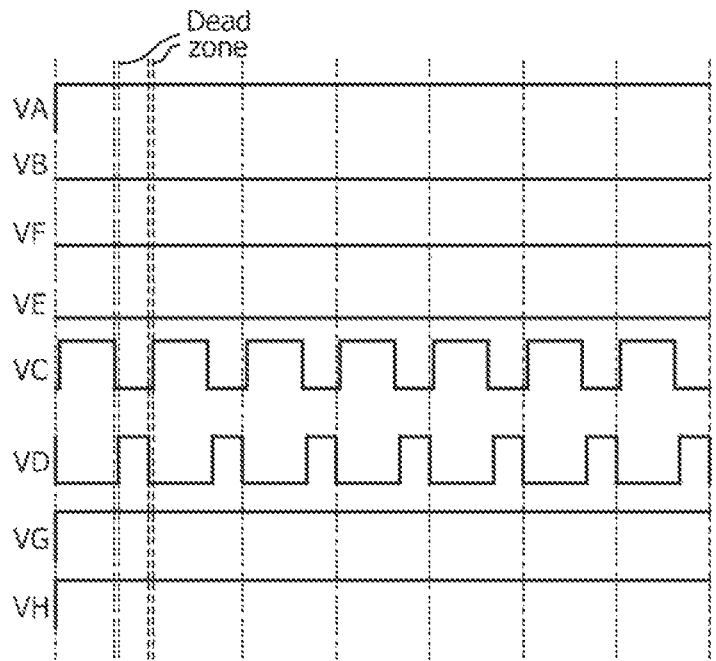
FIG. 3 is a timing diagram illustrating the timing of control signals for a first operating mode (e.g., a buck conversion mode) of one embodiment of a buck and boost converter.

FIG. 3 is a timing diagram illustrating the timing of control signals for a first operating mode, in particular for a buck conversion mode as illustrated in FIG. 3, when controller 230 determines that power converter 110 should operate in the buck conversion mode, controller 230 causes GPIO interface 250 to output first, seventh and eighth output signals VA, VG and VH at a high level so as to turn ON first, seventh and eighth switches SW1, SW7 and SW8, and to output second output signal VB at a low level so as to keep second switch SW2 OFF. Controller 230 also causes PWM generator 260 to generate PWM signals VC and VD to control switching operations of third and fourth switches SW3 and SW4 with an appropriate frequency and duty cycle for a buck conversion mode for converting the input voltage VIN at input node 105 to the output voltage VOUT at output node 115. At this time, PWM generator 260 also outputs fifth and sixth control signals VE and VF at a low level so as to maintain fifth and sixth switches SW5 and SW6 in an OFF state. Clock generator 230 provides a dock signal for controlling the timing of operations in control unit 200, and particularly may be used to generate the frequency and or duty cycle of the PWM signals VC and VD. Controller 230 may vary or adjust at least one of the frequency and the duty cycle of the PWM signals VC and VD to regulate the output provided to output node 115.

Figure 4:
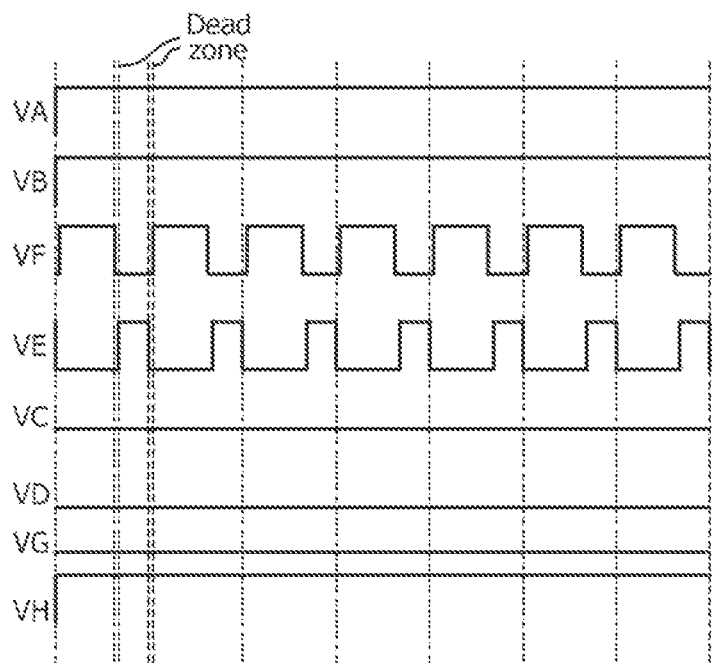
FIG. 4 is a timing diagram illustrating the timing of control signals for a second operating mode (e.g., a boost conversion mode) of one embodiment of a buck and boost converter.

FIG. 4 is a timing diagram illustrating the timing of control signals for a second operating mode in particular for a boost conversion mode. As illustrated in FIG. 4, when controller 230 determines that power converter 110 should operate in the boost conversion mode, controller 230 causes GPIO interface 250 to output first, second and eighth output signals VA, VB and VH at a high level so as to turn ON first, second and eighth switches SW1, SW2 and SW8, and to output seventh output signal VG at a low level so as to keep seventh switch SW7 OFF. Controller 230 also causes PWM generator 260 to generate PWM signals VE and VF to control switching operations of fifth and sixth switches SW5 and SW6 with an appropriate frequency and duty cycle for a boost conversion mode for converting the input voltage VIN at input node 105 to the output voltage VOUT at output node 115. At this time, PWM generator 260 also outputs third and fourth control signals VC and VD at a low level so as to maintain third and fourth switches SW3 and SW4 in an OFF state. Clock generator 230 provides a clock signal for controlling the timing of operations in control unit 200, and particularly may be used to generate the frequency and or duty cycle of the PWM signals VE and VF. Controller 230 may vary or adjust at least one of the frequency and the duty cycle of the PWM signals VE and VF to regulate the output provided to output node 115.

Figure 5:
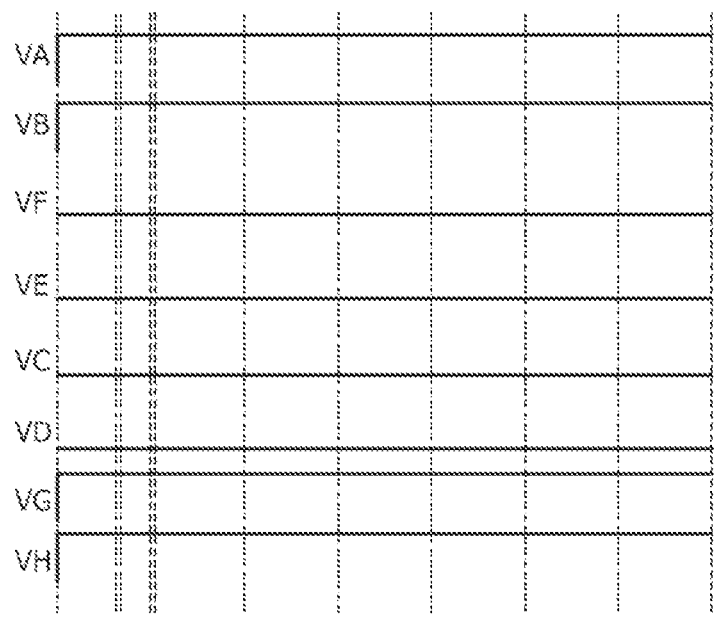
FIG. 5 is a timing diagram illustrating the timing of control signals for a third operating mode (e.g., a direct conversion mode) of one embodiment of a buck and boost converter.

FIG. 5 is a timing diagram illustrating the timing of control signals for a third operating mode, in particular a direct conversion mode. As illustrated in FIG. 5, when controller 230 determines that power converter 110 should operate in the direct conversion mode, controller 230 causes GPIO interface 250 to output first, second, seventh and eighth output signals VA, VB, VG and VH at a high level so as to turn ON first, second, seventh and eighth switches SW1, SW2, SW7 and SW8. At this time controller 230 also causes PWM generator 260 to output third, fourth, fifth and sixth control signals VC, VD, VE and VF at a low level so as to maintain third, fourth, fifth and sixth switches SW3, SW4, SW5 and SW6 in an OFF state.

Figure 6:
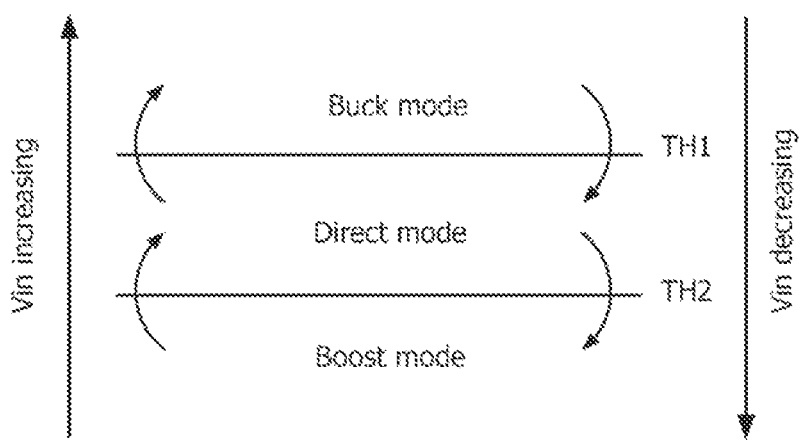
FIG. 6 shows a state diagram illustrating transitions between various operating modes for one embodiment of a buck and boost converter.

FIG. 6 shows a state diagram illustrating transitions between various operating modes for one embodiment of a buck and boost converter. As illustrated in FIG. 6, TH1 is the buck threshold which is the transition point of the input voltage VIN between the buck conversion mode and the direct conversion mode, and TH2 is the boost threshold which is the transition point of the input voltage VIN between the direct conversion mode and the boost conversion mode. When the input voltage VIN at input node 105 increases, power converter 110 changes operating mode according to a sequence: Boost conversion mode→direct conversion mode→buck conversion mode. When the input voltage VIN is decreasing, power converter 110 changes operating mode according to the sequence: Buck conversion mode→direct conversion mode→boost conversion mode.

Apparatus 100 as described above may be employed in a variety of devices or applications, including for example: solar power controllers and inverters; battery chargers with high efficient charging functionality for different batteries (e.g., Li-ion battery, Lead-add battery, Ni-MH battery, and Lithium iron phosphate battery); lighting drivers, for instance, constant current LED drivers for LED-based lighting units or other lighting units employing other light sources; general purpose DC-DC converters which may be included in consumer electronic devices, healthcare devices, etc.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both"

of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses, if any, are provided merely for convenience and should not be construed as limiting the claims in any way.

What is claimed is:

1. An apparatus, comprising:
   a power converter configured to convert an input voltage to an output voltage and to supply the output voltage to a load, the power converter including:
   a buck conversion circuit including a first set of switches comprising first switches, and
   a boost conversion circuit including a second set of switches comprising second switches, wherein the second set of switches is separate from and capable of being controlled independently from the first set of switches; and
   a control unit configured to
   control delivery of power from the power converter to the load via the buck conversion circuit in a buck conversion mode by controlling switching operations of the first switches using corresponding pulse width modulation (PWM) control signals, respectively, and by turning off the second set of switches, and
   to control the delivery of the power from the power converter to the load via the boost conversion circuit in a boost conversion mode by controlling switching operations of the second switches using corresponding PWM control signals, respectively, and by turning off the first set of switches.

2. The apparatus of claim 1, wherein the control unit is configured to receive a sample of the input voltage (Vinput), a sample of the output voltage, (Voutput), a sample of an input current (Iinput) supplied to the power converter, and a sample of an output current (Ioutput) supplied by the power converter, and is configured to control the delivery of the power to the load based on the sample of the input voltage, the sample of the output voltage, the sample of an input current and the sample of the output current.

3. The apparatus of claim 2, wherein the control unit includes a plurality of analog-to-digital converter (ADCs) configured to convert the sample of the input voltage, the sample of the output voltage, the sample of the input current and the sample of the output current to digital values.

4. The apparatus of claim 2, wherein the control unit includes circuitry configured to compare the input voltage and the output voltage to each other, wherein the control unit selects an operating mode of the power converter based on a result of the comparison.

5. The apparatus of claim 2, wherein the control unit is configured to control the delivery of power from the power converter to the load via the buck conversion circuit by switching at least one of the first switches of the first set of switches at a switching frequency and a duty cycle of the corresponding PWM control signal, and by adjusting at least one of the switching frequency and the duty cycle in response to a difference between the sample of the input voltage and the sample of the output voltage.

6. The apparatus of claim 2, wherein the control unit is configured to control the delivery of power from the power converter to the load via the boost conversion circuit by switching at least one of the second switches of the second set of switches at a switching frequency and a duty cycle of the corresponding PWM control signal, and by adjusting at least one of the switching frequency and the duty cycle in response to a difference between the sample of the input voltage and the sample of the output voltage.

7. The apparatus of claim 1, wherein the control unit is configured to control delivery of power from the power converter to the load when the input voltage is greater than a sum of the output voltage and a first fixed voltage, wherein the first fixed voltage is greater than or equal to zero volts, by controlling the switching operations of the first set of switches and bypassing at least one of the turned off second switches via a first by-pass switch; and
   wherein the control unit is configured to control the delivery of the power from the power converter to the load when the input voltage is less than the output voltage by controlling the switching operations of the second set of switches and bypassing at least one of the turned off first switches via a second by-pass switch.

8. The apparatus of claim 7, wherein the first fixed voltage is less than 1 volt.

9. The apparatus of claim 7, wherein the control unit is further configured to control the power converter to operate in a direct conversion mode when the output voltage is greater than a difference between the input voltage and the first fixed voltage, and less than a sum of the input voltage and the second fixed voltage.

10. A method, comprising:
    sampling an input voltage (Vinput), an output voltage (Voutput), an input current (Iinput), and an output current (Ioutput) of a power converter that includes a buck conversion circuit including a first set of switches comprising first switches, and a boost conversion circuit including a second set of switches comprising second switches, wherein the second set of switches is separate from and capable of being controlled independently from the first set of switches;
    when the input voltage is greater than a sum of the output voltage and a first fixed voltage that is greater than or equal to zero volts, controlling delivery of power from the power converter to a load by controlling switching operations of the first switches using corresponding pulse width modulation (PWM) control signals, respectively, and by turning off the second set of switches; and
    when the input voltage is less than the output voltage, controlling the delivery of the power from the power converter to the load by controlling switching operations of the second switches using corresponding PWM control signal respectively, and by turning off the first set of switches.

11. The method of claim 10, wherein controlling delivery of power from the power converter to a load further comprises bypassing at least one of the turned off second switches of the second set of switches by turning on a first by-pass switch arranged in parallel with the at least one of the turned off second switches.

12. The method of claim 11, wherein controlling switching operations of the first switches using the corresponding PWM control signals comprises adjusting one of a frequency and a duty cycle of each PWM control signal in response to a difference between the input voltage and the output voltage.

13. The method of claim 10, wherein controlling delivery of power from the power converter to a load further comprises bypassing at least one of the turned off first switches of the first set of switches by turning on a second by-pass switch arranged in parallel with the at least one of the turned off second switches.

14. The method of claim 13, wherein pulse width modulating the one or more control signals comprises adjusting one of a frequency and a duty cycle of each pulse width modulated control signal in response to a difference between the input voltage and the output voltage.

15. The method of claim 10, wherein the first fixed voltage is less than 1 volt.

* * * * *